Patented Nov. 24, 1925.

1,563,203

UNITED STATES PATENT OFFICE

LEON LILIENFELD, OF VIENNA, AUSTRIA.

PROCESS OF PRODUCING VISCOUS LIQUIDS AND PRODUCT THEREOF.

No Drawing.     Application filed January 10, 1921. Serial No. 436,382.

(GRANTED UNDER THE PROVISIONS OF THE ACT OF MARCH 3, 1921, 41 STAT. L., 1313.)

*To all whom it may concern:*

Be it known that I, LEON LILIENFELD, of Podhajce, Poland, a citizen of Poland, residing at Vienna VIII, Austria, have invented certain new and useful Improvements in a Process of Producing Viscous Liquids and Product Thereof, of which the following is a specification (for which Austrian Patent No. 89,803 was issued on an application filed August 1, 1919).

Investigations have shown that by the action of acetylene on the high boiling portions of tar oils, in particular the fractions boiling above 140° C., viscous oils are formed which are adapted for numerous technical and therapeutic uses.

The oils produced according to the present invention are in their rectified form practically colorless or slightly yellowish coloured liquids having a marked blue fluorescence and possessing a high viscosity. They are applicable as lubricants for a large number of objects. They are, however, also adapted for therapeutic use as they constitute an unsaponifiable vehicle for medicinal agents, as additions to salves in place of vegetable and animal oils and the like and may also be used as photodynamic sensitizing agents.

For carrying out the process, the higher boiling portions of tar oil, for example the easily obtainable fraction of solvent naptha, boiling between 145° to 200° C., as also a hydrocarbon isolated from this fraction, for example mesitylene, pseudocumene or the like, are treated, preferably under the action of heat, with gaseous acetylene in the presence of aluminium chloride.

*Example.*

To 1,000 grammes of a fraction of coal tar oil boiling between 140 and 185° C., 5 to 100 grams of sublimed pulverized aluminium chloride are added. Acetylene is led into this mixture, while the latter is thoroughly stirred and gradually heated. The introduction of the acetylene is continued at temperatures between 50–150° C., so long as acetylene is absorbed.

The reaction mass consists mainly of a brown black viscous oil. To the walls of the reaction vessel a black semi-solid mass adheres which is possibly an organic addition product of aluminium chloride.

The working up of the reaction mixture can be carried out by:

(*a*) Separating the aluminium chloride compound by filtration or the like from the oil and freeing the latter from hydrochloric acid by treatment with calcium oxide;

(*b*) Decomposing the aluminium chloride compound by treating the reaction mixture with water and freeing the oil from acid by washing with alkali and water.

The oil obtained by the treatment (*a*) or (*b*) is dried and fractionated under reduced pressure.

At a pressure of 20 millimetres of mercury between 85° C. and 260° C. a viscous oil having a blue fluorescence passes over, which by fractional distillation can be further separated into oils differing in viscosity and fluorescence.

The properties of the oils prepared according to the above example are as follows:—

Composition: essentially aromatic hydrocarbons, and practically free from aliphatic hydrocarbons.

Boiling limits: 180 to 300° C. at about 35 mm. mercury.

Specific gravity: $D15: 1.085$;

Color: light yellow with blue fluorescence;

Smell: faintly of aromatic hydrocarbon;

Viscosity: at 20° C., 41.6 degrees Engler; at 50° C., 3.04 degrees Engler;

Molecular weight: determined by freezing point, depression dissolved in phenol; 248.4;

Solubility: miscible in all proportions with all liquid aliphatic and aromatic hydrocarbons, also with phenol, nitrobenzene, chlorbenzene, chloroform, carbon bisulphide, carbon tetrachloride, acetone, acetic ether, and amyl alcohol.

Solubility in methyl alcohol, ethyl alcohol and glacial acetic acid: 1 cub. cm. of oil manufactured according to the present process requires for dissolving, methyl alcohol 15 cub. cm., ethyl alcohol (96 percent) 7 cub. cm., glacial acetic acid 7 cub. cm.

As a distillation residue a dark brown resin of the consistency of hard pitch remains.

What I claim and desire to secure by Letters Patent, is:—

1. Process of making high boiling viscous oily liquids which comprises bringing acetylene into contact with coal tar hydrocarbons, boiling at above 140° C., in the presence of aluminium chloride.

2. Process of producing high boiling viscous oily liquids which comprises causing acetylene to react in the presence of aluminium halide, upon coal tar hydrocarbon boiling between about 140 to 220° C.

3. A process of producing high boiling viscous oily liquids which comprises bringing acetylene into contact with coal tar hydrocarbon boiling to above 140° C., in the presence of an aluminium halide.

4. As new products, the herein described oils which may be produced by reacting upon coal tar hydrocarbons boiling at above 140° C., with acetylene in the presence of aluminum halides, such products being colorless to yellow oils having a marked blue fluorescence and a high viscosity and being unsaponifiable and having lubricating properties and which distill over, from the oily material remaining after removing the aluminum halides, at between 85 and 260° C., under a pressure of 20 mm. of mercury, such oils being composed essentially of aromatic hydrocarbons, practically free from aliphatic hydrocarbons, boiling between about 180° C. and about 300° C., at a pressure of about 35 mm. of mercury, having a specific gravity a little greater than unity, and being freely miscible with hydrocarbon oils of the aliphatic and aromatic series, nitrobenzene, chlorbenzene, chloroform, carbon bisulphide and carbon tetrachloride.

In testimony whereof I have signed my name to this specification.

Dr. LEON LILIENFELD.